United States Patent [19]
Johnson

[11] 3,893,621
[45] July 8, 1975

[54] PLASTIC SPRAY GUN

[76] Inventor: Jay Johnson, 5350 Tessen Dr., La Canada, Calif. 91011

[22] Filed: Jan. 24, 1974

[21] Appl. No.: 436,028

[52] U.S. Cl. ............ 239/9; 239/336; 239/415; 239/422; 239/427.5
[51] Int. Cl. ............ B05b 7/14; B05b 7/08
[58] Field of Search ............ 239/8, 9, 10, 112, 113, 239/291, 292, 296, 299, 306, 314, 549, 335, 336, 545, 398, 400, 543, 413, 414, 415, 416.1, 418, 427.3, 419, 419.3, 427.5, 419.5, 420, 428, 421, 422, 423, 424, 424.5, 427

[56] References Cited
UNITED STATES PATENTS

| | | | |
|---|---|---|---|
| 3,249,304 | 5/1966 | Faro et al. | 239/10 |
| 3,399,834 | 9/1968 | Bradley | 239/10 |
| 3,542,296 | 11/1970 | Bradley | 239/306 |
| 3,606,154 | 9/1971 | Tufts | 239/8 |
| 3,676,197 | 7/1972 | Harrison et al. | 239/422 X |
| 3,801,009 | 4/1974 | Marshall | 239/9 |

FOREIGN PATENTS OR APPLICATIONS

| | | | |
|---|---|---|---|
| 735,983 | 8/1955 | United Kingdom | 239/296 |

*Primary Examiner*—Robert S. Ward, Jr.

[57] ABSTRACT

A spray gun discharges air and suspended solid particles through an opening forming a diverging stream. A first pair of nozzles adjacent to the opening form airless sprays of a liquid promoted resin. A second pair of nozzles adjacent to the opening form sprays of liquid catalyst and low pressure air, the stream of particles mixing with the promoted resin and catalyst in front of the spray gun.

14 Claims, 8 Drawing Figures

PLASTIC SPRAY GUN

FIELD OF THE INVENTION

This invention relates to spray guns, and more particularly is concerned with a spraying device for coating or forming a laminate using a mixture of fiberglass and a promoted polyester resin with catalyst present.

BACKGROUND OF THE INVENTION

The use of hand-held spray guns to spray a coating or laminate of fiberglass and polyester resin, for example, is well known. Because once the resin and catalyst are mixed together a setting or polymerization takes place rapidly, it is not practical to pre-mix these materials. They must be mixed continuously during the spraying process. For this reason it has been standard practice to bring these materials together in the spray gun, mixing them either just prior to forming the spray, or by pre-mixing separate batches of unpromoted resin with catalyst and resin with promoter, separately spraying the two mixtures and allowing them to converge and come together outside of the spray gun. The former arrangement has the disadvantage that mixing of the material inside the spray gun presents a cleaning problem, since the mixed material must be completely flushed from the gun before the material sets up and clogs the gun completely. The second arrangement avoids this problem by having mixing take place in the spray pattern in front of the gun. However, the pre-mixed resin and catalyst, even without the promoter present, does begin to polymerize although at a much slower rate. This means the pre-mixed materials must be used up within a relatively short time. The catalyst material, methylethyl keytone peroxide or the equivalent, is a highly unstable and dangerous liquid. To directly atomize and spray the catalyst with high-pressure air is hazardous. To provide an airless spray of the catalyst is also hazardous because of the high pressures required to atomize the undiluted liquid. One prior art proposal has been to dilute the catalyst with a suitable diluent to lower the viscosity and thereby reduce the pressure required to provide an airless spray. However, the presence of the diluent in the finished laminate reduces the quality of the laminate and adds to the cost.

SUMMARY OF THE INVENTION

The present invention provides an improved spray gun for spraying plastic materials for depositing a reinforced plastic. One of the unique aspects of the spray gun is in the separate spraying of the promoted resin in the form of an airless spray at sufficient hydraulic pressure to provide an effective coating pattern. The catalyst is separately sprayed in a very low-pressure air atomized form just sufficient to carry the catalyst material a few inches beyond the nozzle where it mixes with the resin spray from the airless resin spraying nozzle. Fiberglass particles are directed into the center of the converging spray patterns where they become completely entrained with and carried along by the high velocity resin particles.

DESCRIPTION OF THE DRAWINGS

For a better understanding of the invention reference should be made to the accompanying drawings, wherein.

DETAILED DESCRIPTION

Figure 1:
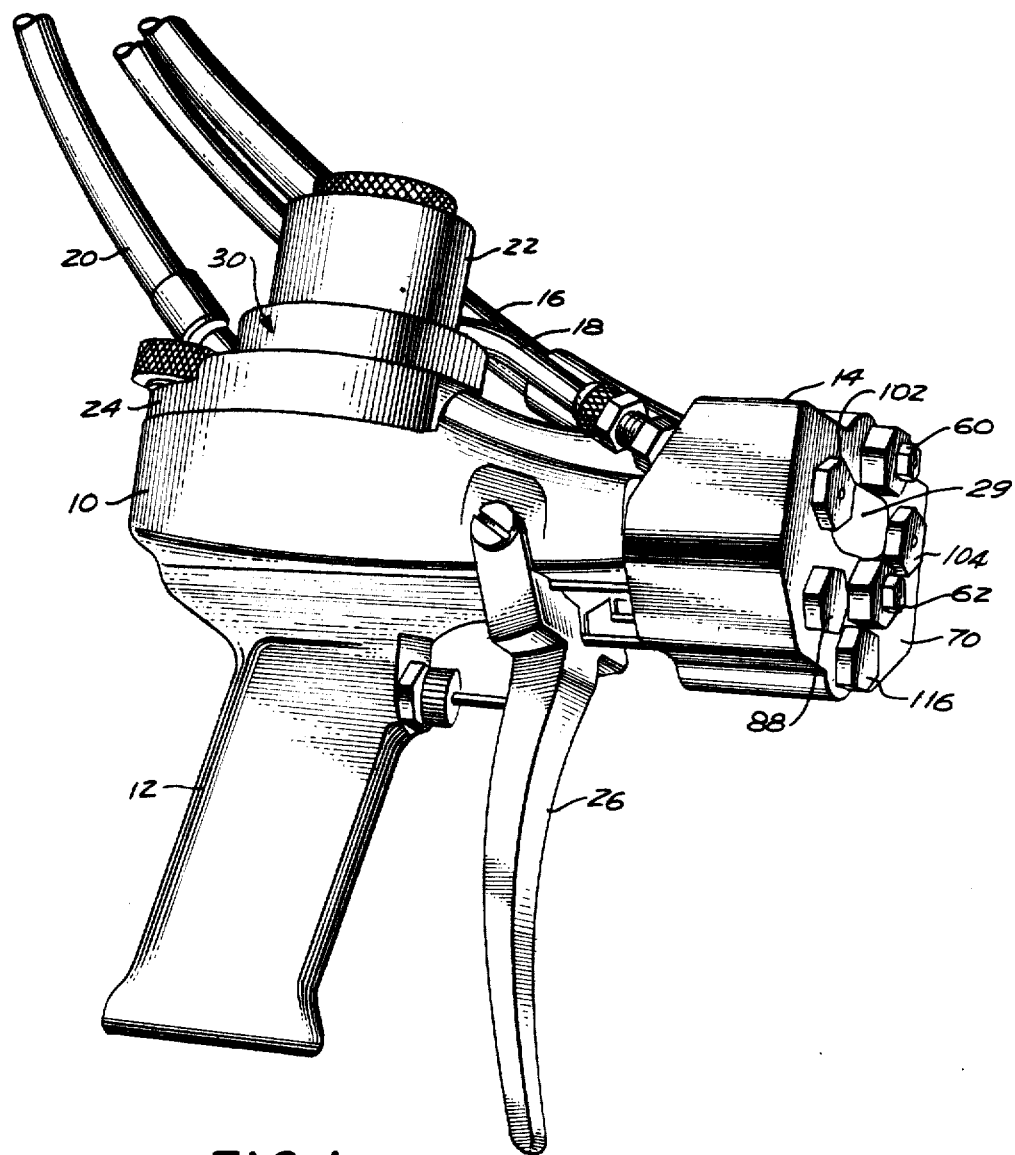
FIG. 1 is a perspective view of the spray gun assembly.
Figure 2:
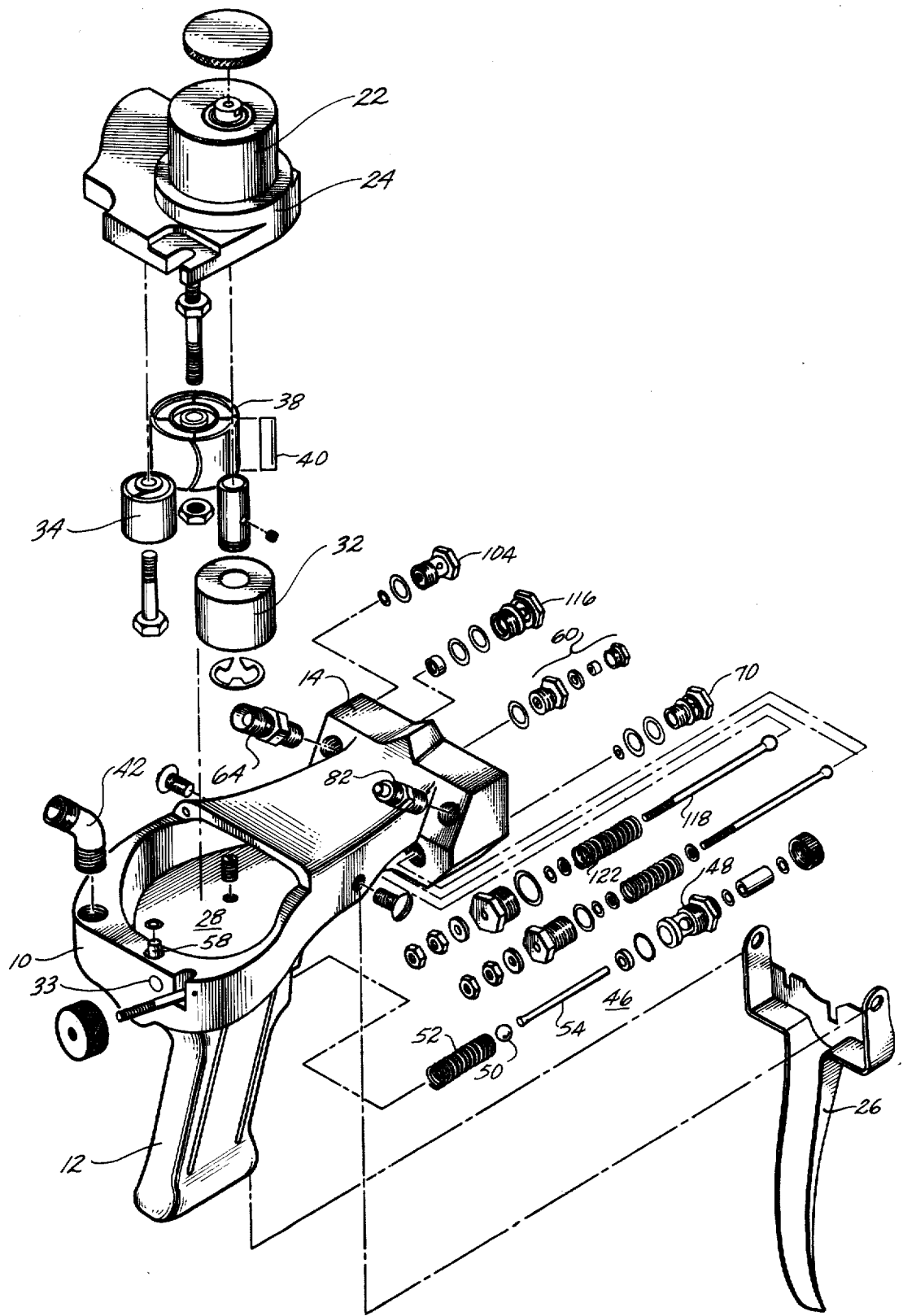
FIG. 2 is an exploded view of the spray gun assembly.

Referring to the drawings in detail, the spray gun includes a housing 10 to which is integrally cast a handle 12 and a nozzle head 14. Promoted resin is supplied to the nozzle head through a hose 16 while catalyst is supplied to the nozzle head through a hose 18. A hose 20 provides compressed air at standard line pressures of 90 to 120 psi. An air motor 22, used to operate a chopper for cutting up fiberglass roving or the like, is mounted on a removable housing cover 24. A trigger 26 operates to control the spray gun.

The spray gun includes a hollow chamber 28 with a discharge passageway terminating in an opening 29 in the nozzle head 14. With the cover 24 in place, a chopper assembly 30, for cutting up roving into short length fibers and driven by the motor 22, projects down into the chamber 28. The chopper assembly 30 includes a drive roller 32 made of soft rubber or other similar material which is mounted on the output shaft of the motor 22 and is driven thereby at relatively high speed. A pinch roller 34 is in rolling contact with the drive roller 32. Glass roving, entering the chamber 24 through an opening 33 in the back of the housing 10, passes between the roller 32 and pinch roller 34. A cutter wheel 38 having a plurality of sharp projecting cutter blades 40 around the periphery thereof is also in rolling contact with the roller 32. The cutters chop the glass roving into short lengths which, as hereinafter described, are blown out of the chamber 28 through the discharge opening 29 by air admitted to the chamber.

Figure 3:
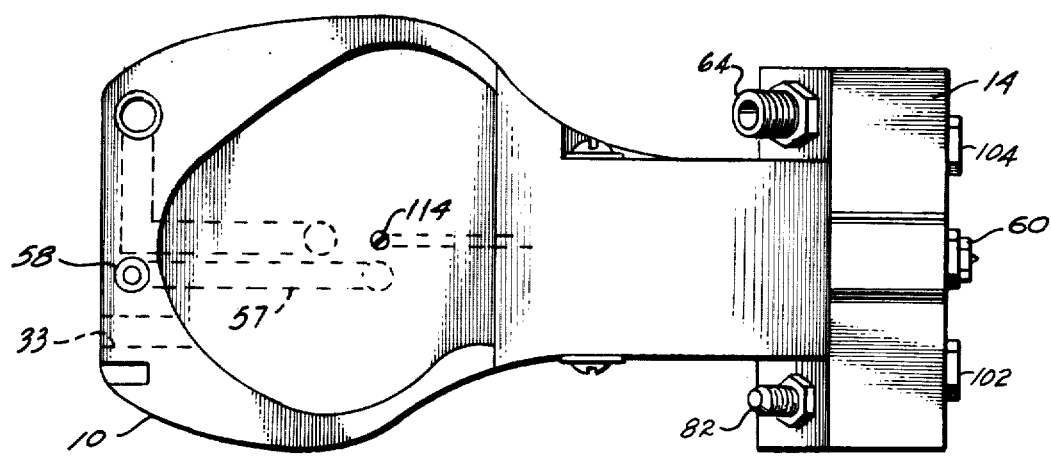
FIG. 3 is a top view of the spray gun with the cutter assembly removed.

The air from the line 20 enters through an intake coupling 42 adjacent the rear of the housing 10. The air is directed from the input coupling through a passage 44 to an air control valve assembly, indicated generally at 46, positioned in the handle 12 of the housing. The valve is of conventional design and includes a bushing 48 which threads into the handle 12. A ball 50, under load from a compression spring 52, closes off a passage in the bushing. A valve control stem 54, actuated by the trigger 26, passes through the bushing and presses against the ball, lifting the ball off its seat, allowing the air from the passage 44 to enter an annular space 56 formed by the bushing 48. A passage 57 is provided in the housing which leads to a nipple 58 (see FIG. 3), which nipple seats in the cover 24 and connects to a passage in the cover going to the air motor 22. Thus opening of the valve 46 turns on the air motor 22 to operate the cutter. After passing through the air motor 22, the air is exhausted from the motor back into the chamber 28 where it picks up the shredded roving and blows it out through the discharge opening 29.

Figure 7:
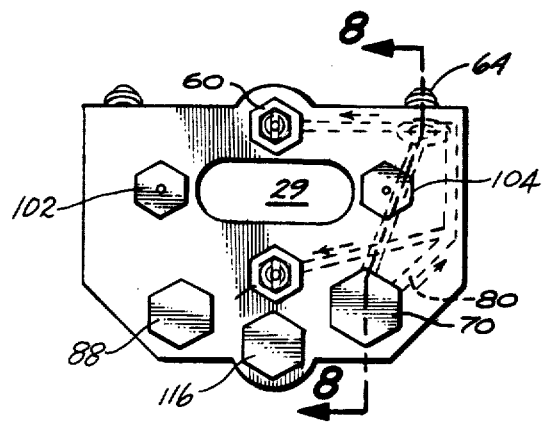
FIG. 7 is a front view of the discharge end of the spray gun showing only the resin passages.
Figure 8:
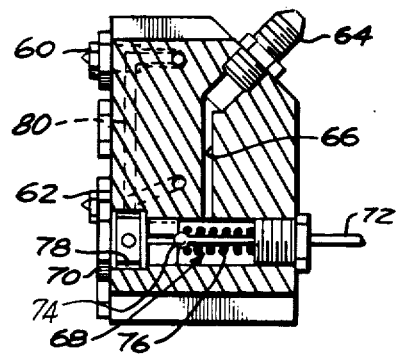
FIG. 8 is a sectional view taken substantially on the line 8—8 of FIG. 7.

The nozzle head 14, in addition to the discharge opening 29, includes two resin discharge nozzles 60 and 62 positioned respectively directly above and below the opening 29. The nozzles 60 and 62 are conventional type of airless liquid spray nozzles which are threaded into the discharge head. A mixture of resin and promoter is supplied through the hose 16 and a coupling 64 on the back side of the nozzle head 14. As shown in FIGS. 7 and 8, the promoted resin is directed from the coupling 64 through a passage 66 to the resin control valve assembly indicated generally at 68. The valve assembly 68 includes a bushing 70, a valve stem 72 terminating in a ball 74 which seats in the end of a passage in the bushing 70. The valve is closed by a compression spring 76 that urges the ball 74 against its seat. The valve stem 72 is connected to the trigger 26 such that the trigger 26 pulls on the valve stem against the action of the spring 76, opening the valve and permitting resin to pass through the bushing into an annular space 78 on the outside of the bushing. A passage 80 extends from the annular space 78 to each of the nozzles 60 and 62.

The promoted resin is pressurized at the supply source in conventional manner to provide hydraulic pressure at the nozzle head of approximately 200 to 1500 psi, or even higher for very heavy resins. The nozzles mechanically break up the liquid promoted resin into fine droplets which are discharged at high velocity in a substantially fan-shaped pattern for effectively coating a surface with resin at a distance of two to three feet from the nozzles.

Figure 6:
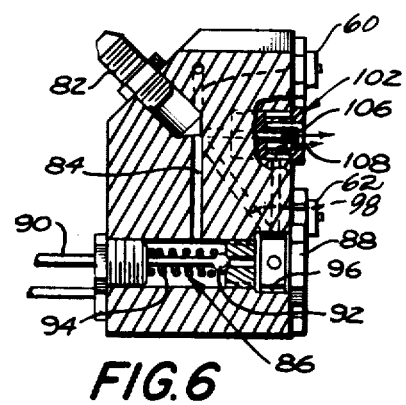
FIG. 6 is a sectional view taken substantially on the line 6—6 of FIG. 5.

Catalyst is introduced into the resin spray to produce polymerization of the resin by separately spraying the catalyst into the spray pattern of the promoted resin. To this end, the catalyst, as supplied through the hose 18, is connected to the nozzle head 14 through a coupling 82. The catalyst, under a source pressure of as low as 10 psi and preferably no more than 15 psi, is directed through a passage 84 into a valve assembly 86 similar to the valve assembly 68 described above. One of the features of the present invention is that very low hydraulic pressure is required for the catalyst to substantially reduce or eliminate the hazard of explosion of the unstable catalyst without dilution by another material or other preconditioning. The valve assembly 86 includes a bushing 88 which is threaded into the housing. A valve stem 90 terminates in a ball 92 which seats on the end of the bushing 88 under the action of a compression spring 94. The valve stem 90 is coupled to the trigger 26 so that when the trigger 26 is actuated, the valve stem 90 lifts the ball 92 off the bushing seat. This allows catalyst to pass through the bushing into an annular space 96. From the annular space 96 the catalyst is directed by means of passages 98 and 100 to respective discharge nozzles 102 and 104 located on either side of the opening 29. As shown in FIG. 6, the nozzle 102 has a central discharge orifice 106 through which the catalyst is discharged.

Figure 4:
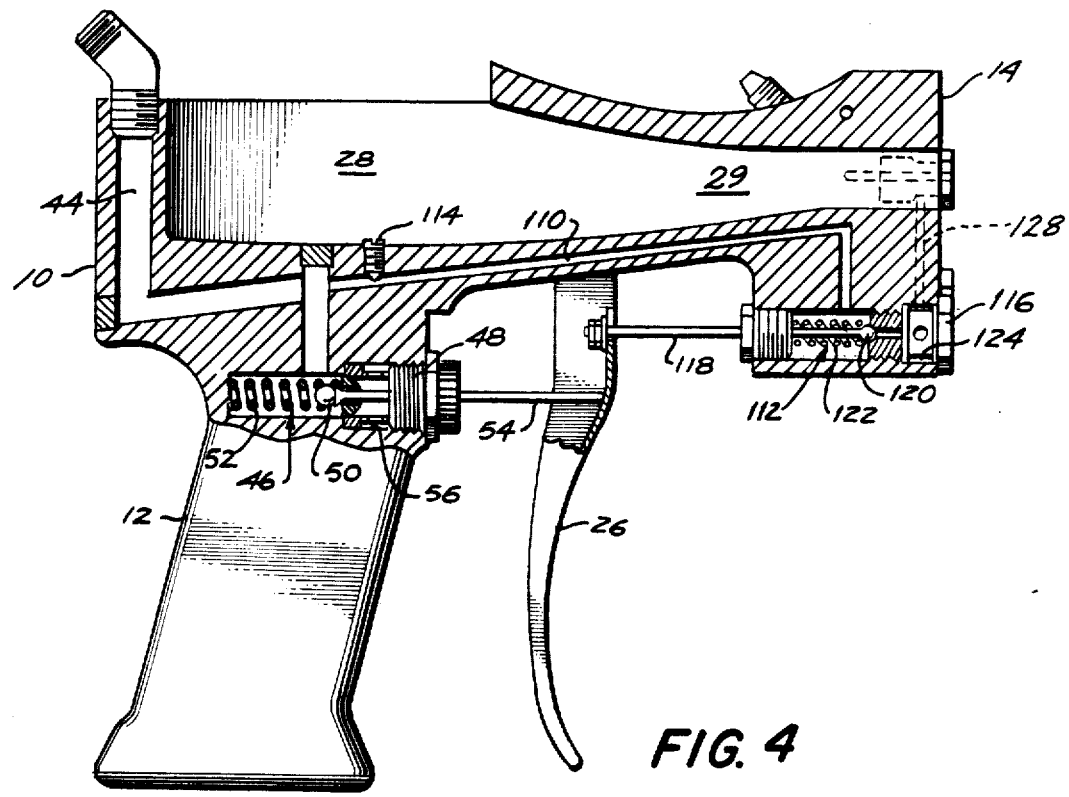
FIG. 4 is a longitudinal sectional view taken substantially on the line 4—4 of FIG. 5.
Figure 5:
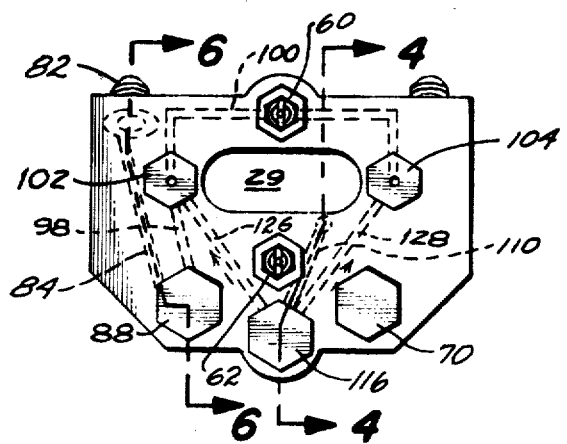
FIG. 5 is a discharge end view of the spray gun showing only the catalyst and air passages.

The discharged catalyst is atomized by air discharged through an annular opening 108 surrounding the orifice 106. To provide air at low pressure, for example approximately 10 psi, to the nozzles 102 and 104 for atomizing the catalyst, an air passage 110 is provided leading from the air intake passage 44 to a valve assembly 112 (see FIG. 4). A threaded needle valve 114 in the bottom of the chamber 28 can be adjusted to meter the amount of air entering the passage 110 so as to drop the pressure to the desired working pressure.

The valve assembly 112 mounted in the nozzle head 14 is similar to the valves 68 and 86. The valve assembly includes a bushing 116 threaded into the housing and providing a valve seat against which a valve stem 118 terminating in a ball 120 is seated by compression spring 122. The valve is opened by the trigger 26 pulling on the valve stem 118, permitting air to pass into an annular space 124 formed by the bushing 116. Passages 126 and 128 direct air from the annular space to the annular openings 108 of the nozzles 102 and 104.

The nozzles 102 and 104 are designed to provide a very low velocity atomized spray of catalyst which provides the catalyst with only enough velocity to carry the spray a few inches out from the nozzle head 14. The spray pattern of the catalyst nozzles is such as to direct the catalyst directly into the fanning pattern of promoted resin. Complete entrainment and mixing of the catalyst with the resin takes place within a few inches distance from the nozzles. The combined resin and catalyst completely surrounds the discharged fiberglass particles, so that the high velocity spray pattern of the resin defines the outer boundaries of the mixture of resin, catalyst and fiberglass particles directed at the surface being spray-coated.

By discharging the catalyst at very low velocity, the hydraulic pressure of the catalyst and the atomizing air can be maintained at very low and safe limits. The hydraulic pressure of the resin is an order of magnitude higher than the pressure of the catalyst. The resulting high velocity of the resin spray produces a reduced pressure region around the spray into which the low-velocity catalyst spray is drawn, insuring complete mixing. Furthermore, there is little chance for atomized catalyst to escape into the surrounding air where it can become a health hazard. The external mixing of the catalyst and promoted resin outside the spray gun eliminates any problems with keeping the spray gun clean and free of polymerized material. By surrounding the discharged solid particles, whether they be fiberglass or other solid filler materials which may be used, with the resin and catalyst sprays, any chance of fallout of the solid material from the spray is minimized.

Another advantage of the present gun is that control of the combined spray of the promoted resin, catalyst and solid filler material is provided by a single trigger. In operation, the respective valves are set so that the catalyst air valve 112 opens first, followed by the catalyst valve 86 and the resin valve 68. The cutter motor control air valve 46 requires further movement of the trigger 26 of a sufficient amount that the operator can readily initiate a spray without the solid or particulate matter, if desired.

What is claimed is:

1. A spray gun for spraying fiberglass and liquid resins, comprising:
    means having an opening for discharging a stream of air and solid particles into the atmosphere,
    air atomizing nozzle means positioned adjacent the opening,
    means connecting low pressure liquid catalyst and low pressure air to said nozzle means for providing an air atomized spray of catalyst from said nozzle means,
    airless nozzle means positioned adjacent the opening, and means connecting a liquid mixture of promoted resin under relatively high pressure to the airless nozzle means to provide a liquid spray of promoted resin, the air atomized catalyst spray and the liquid resin airless spray intersecting each other and the air and solid particle stream outside the spray gun to provide a combined spray pattern of solid particles, promoted resin and catalyst.

2. Apparatus of claim 1 wherein the pressure of the catalyst and the air at the air atomizing nozzle mean is about one atmosphere above ambient.

3. Apparatus of claim 1 wherein the atomizing nozzle means sprays the catalyst only a few inches out from the nozzle.

4. Apparatus of claim 1 wherein the hydraulic pressure of the promoted resin at the nozzle means is substantially greater than the pressure of the catalyst.

5. Apparatus of claim 1 wherein the hydraulic pressure of the promoted resin at the nozzle means is of the order of a magnitude higher than the pressure of the catalyst.

6. Apparatus of claim 1 wherein the air atomizing nozzle means and airless nozzle means each includes at least two nozzles, the nozzles being spaced around said opening.

7. A spray gun comprising a housing having a spray head, first nozzle means mounted in the spray head, a source of promoted resin under high pressure, means including a first valve for directing resin from said high pressure source through said first nozzle means, second nozzle means in the spray head, a source of catalyst under very low pressure relative to the pressure of the resin source, and means including a second valve for directing catalyst from said very low pressure source through said second nozzle means, the second nozzle means directing the catalyst in a low velocity spray that intersects the resin spray from the first nozzle means immediately in front of the spray head, the low velocity catalyst spray being drawn along and mixed by the higher velocity of the resin spray.

8. Apparatus of claim 7 wherein the second nozzle means includes means for mixing liquid and gas to form an air atomized spray and further comprising a source of air under low pressure, and means including a third valve for connecting the low pressure air to said second nozzle means.

9. Apparatus of claim 8 wherein the spray gun further includes a trigger movably connected to the housing, and means linking the trigger to the first, second, and third valve means, the linking means, on actuation of the trigger, opening the third, second and first valves in that sequence.

10. The method of forming a spray pattern of polymerizable resin, catalyst, and solid particle filler for applying a coating or laminate to a mold or other object, comprising the steps of:

forming a stream of air and solid particles directed through the atmosphere to the object being coated, forming an air atomized spray of catalyst, forming a liquid airless high velocity spray of promoted resin, the resin converging on the stream of air and solid particles in the atmosphere between the source of said stream and the object being coated, the spray of catalyst converging on the stream of air and solid particles and the resin spray in the atmosphere between the source of said stream and the object being coated, whereby the sprays of catalyst and resin converge on, and mix with the stream of solid particles in the atmosphere before coating on the object.

11. The method of claim 10 wherein the catalyst and air are sprayed at a very low pressure to form a very low velocity spray, and the resin is sprayed at a very high pressure to form a high velocity spray.

12. The method of claim 11 wherein multiple sprays of air atomized catalyst and promoted resin are formed, the multiple sprays converging on the stream of air and solid particles from all sides.

13. The method of forming a spray pattern of promoted resin and catalyst, for applying a coating or laminate to a mold or other object, comprising:

spraying liquid promoted resin at a high pressure to form a high velocity airless spray pattern of promoted resin;

spraying air atomized catalyst at a relatively low pressure to form a low velocity air assisted spray pattern of catalyst;

said spray of promoted resin and said spray of catalyst converging in the atmosphere between the points of discharge of said sprays and the object being coated, such that the low velocity spray of catalyst is drawn into the high velocity spray of promoted resin, thereby to insure mixing of the two sprays and keep the atomized catalyst from escaping into the surrounding air.

14. A spray gun as claimed in Claim 6 wherein there are provided two atomizing nozzles disposed on opposite sides of said opening in a first plane and two airless nozzles disposed on opposite sides of said opening in a second plane perpendicular to said first plane.

* * * * *